(12) United States Patent
Schambre et al.

(10) Patent No.: US 6,196,603 B1
(45) Date of Patent: Mar. 6, 2001

(54) CARGO BOX DROP-DOWN GATE ASSEMBLY

(75) Inventors: John Schambre, Canton; Michael D. Tesauro, Wixom; Joseph J. Alongi, New Baltimore; David L. Garber, Canton, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/342,419

(22) Filed: Jun. 29, 1999

(51) Int. Cl.[7] .................................................. B62D 33/03
(52) U.S. Cl. ............................................. 296/14; 296/57.1
(58) Field of Search .................................. 296/14, 36, 50, 296/57.1, 58, 183, 26.12, 26.15, 26.04, 26.06

(56) References Cited

U.S. PATENT DOCUMENTS

| | | |
|---|---|---|
| 1,038,247 | 9/1912 | Weitzel . |
| 1,311,644 | 7/1919 | Flom . |
| 2,011,965 | 8/1935 | Ball . |
| 2,695,192 * | 11/1954 | Strom . |
| 2,711,343 | 6/1955 | Falk et al. . |
| 4,171,844 * | 10/1979 | Landaal et al. . |
| 4,328,988 | 5/1982 | Patterson et al. . |
| 4,341,413 * | 7/1982 | Woods . |
| 4,580,828 * | 4/1986 | Jones . |
| 4,688,308 | 8/1987 | Alvarez . |
| 4,861,096 | 8/1989 | Hastings . |
| 5,104,172 * | 4/1992 | Schildt . |
| 5,170,746 * | 12/1992 | Roose . |

* cited by examiner

Primary Examiner—D. Glenn Dayoan
Assistant Examiner—Patricia Engle
(74) Attorney, Agent, or Firm—Roland A. Fuller, III

(57) ABSTRACT

The present invention relates to a drop-down gate assembly of a cargo box for a vehicle. The drop-down gate assembly includes a gate operably coupled to the cargo box by an upper connection assembly and a lower connection assembly, each assembly including a kickout link mechanism for laterally positioning the gate with respect to the cargo box and a roller mechanism for vertically positioning the gate with respect to the cargo box. In this manner, the gate is positioned laterally outwardly to provide clearance from the vehicle and vertically downwardly to facilitate access to the interior volume of the cargo box.

24 Claims, 5 Drawing Sheets

CARGO BOX DROP-DOWN GATE ASSEMBLY

BACKGROUND OF THE INVENTION

1. Technical Field

The present invention generally pertains to a gate assembly for a motor vehicle. More specifically, but without restriction to the particular embodiment which is shown and described for purposes of illustration, the present invention relates to a drop-down gate assembly for use in conjunction with a cargo box of a pickup truck or other similar vehicle.

2. Description of the Related Art

Pickup trucks and other similar cargo vehicles represent a class of vehicles which command extremely high sales volume. Vehicles of this type are used in a wide variety of commercial, as well as recreational endeavors. Typically, these vehicles include a generally rectangular cargo box located on a rearward portion of the vehicle frame. Historically the cargo box is accessed via a drop gate assembly associated with the rearward most transverse wall portion of the cargo box. More specifically, a tailgate assembly is pivotally coupled to the cargo box and positionable between a closed position wherein the tailgate is generally vertically oriented and an open position wherein the drop gate is generally horizontally positioned.

However, it has been recognized that the transfer of goods from the rear of the vehicle may at some times be difficult because of limited access behind the vehicle. Furthermore, it has been recognized that certain advantages may be obtained by permitting access to the articles stored within the cargo box from the side of the vehicle rather than from the rear of the vehicle. In this regard, the prior art discloses various embodiments in which a portion of the side panel of a cargo box may be manipulated between an open position and a closed position. For example, U.S. Pat. No. 1,038,247 discloses a wagon box in which the side panel is pivotally coupled to the wagon box. Various embodiments for a panel truck in which the side panel may be pivoted upwardly into an open position, as disclosed in U.S. Pat. No. 2,711,343 and U.S. Pat. No. 4,688,308 the side panel may be pivotally rotated downwardly as disclosed in U.S. Pat. No. 4,328,988. Lastly, U.S. Pat. No. 4,861,096 discloses a pickup truck box with a vertically hinged passenger door mounted in a side panel thereof. While each of these embodiments provide certain access to the cargo box of the pickup, they also require substantial swing clearance for manipulation of the gate from the closed position to the open position. Moreover, some of these designs provide only limited access to the cargo box.

Accordingly, there is a need to provide an improved cargo box drop-down gate assembly which is operable within a compact space, and yet provides facilitated access to the entire cargo box.

SUMMARY OF THE INVENTION

It is a general object of the present invention to provide a box assembly for a cargo vehicle having a drop-down gate assembly.

It is another object of the present invention to provide a drop-down gate assembly which is operable in a two-step process for extending the gate laterally outwardly from the vehicle to provide clearance and downwardly to provide facilitated ingress and egress to the cargo box area.

It is a further object of the present invention to provide a drop-down gate assembly operably supported from a sport bar structure fixedly secured within the cargo box.

It is an additional object of the present invention to provide a drop-down gate assembly having a kickout link mechanism operable to position the gate assembly laterally outwardly from the cargo box and a flexible roller guide mechanism to position the gate assembly vertically downward from the cargo box.

To achieve the foregoing objects, the present invention is a drop-down gate assembly for a pickup or other similar cargo vehicle including a gate operably coupled to the vehicle at a pair of upper connection assembly associated with the upper corners of the gate assembly and a lower connection assembly associated with the lower middle portion of the gate. Each upper connection assembly includes a kickout link mechanism having a first member secured to the gate and a second member secured to a roller guide assembly. The flexible roller guide mechanism includes a plurality of roller brackets operably disposed around a sport bar for reciprocating motion thereupon. The lower connection assembly includes a kickout link mechanism secured to a portion of the cargo box and a track and roller assembly operably associated with the gate assembly.

Additional benefits and advantages will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
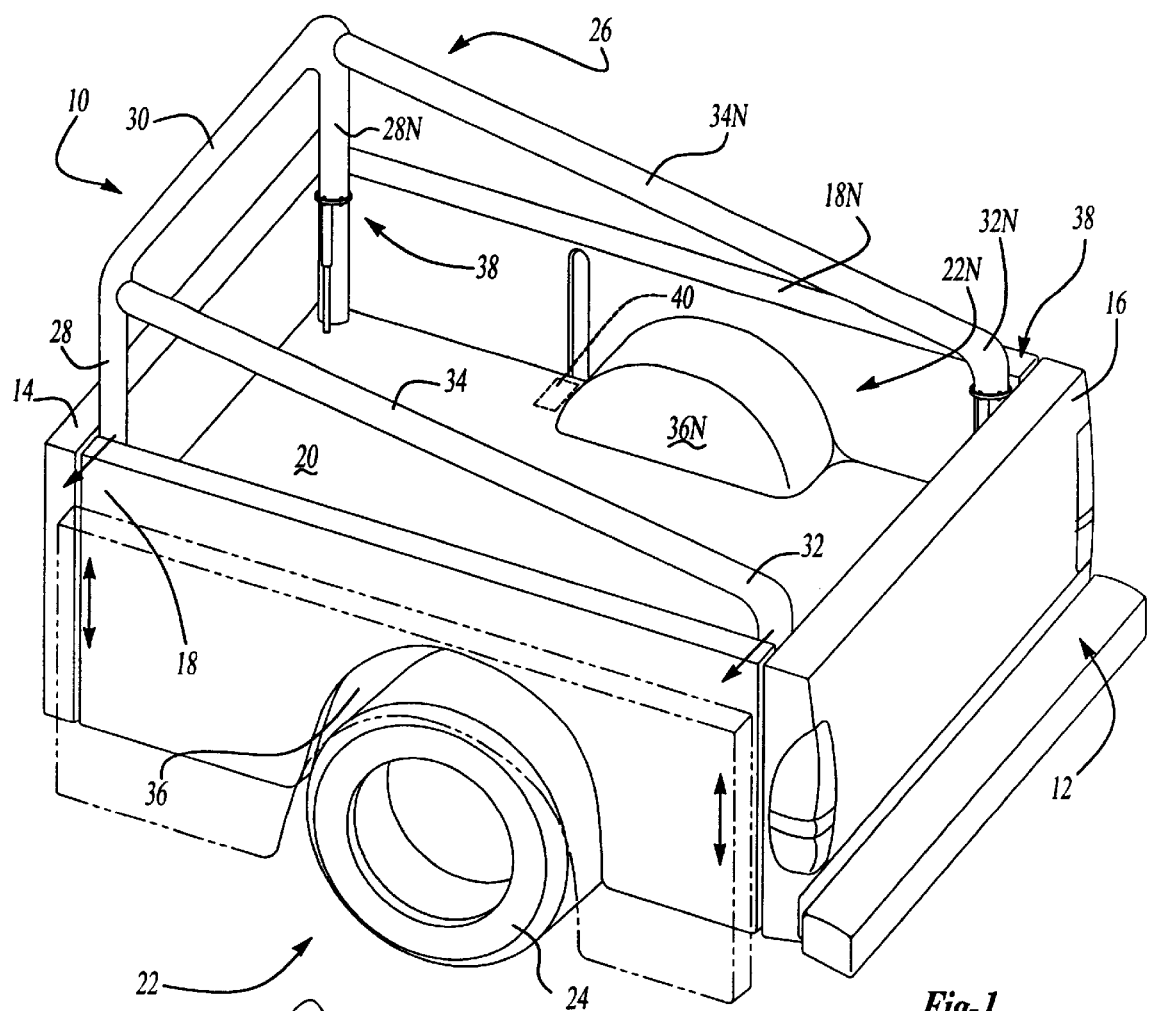
FIG. 1 is a perspective view of the cargo box of a pickup truck in accordance with the teachings of a preferred embodiment of the present invention.
Figure 3:
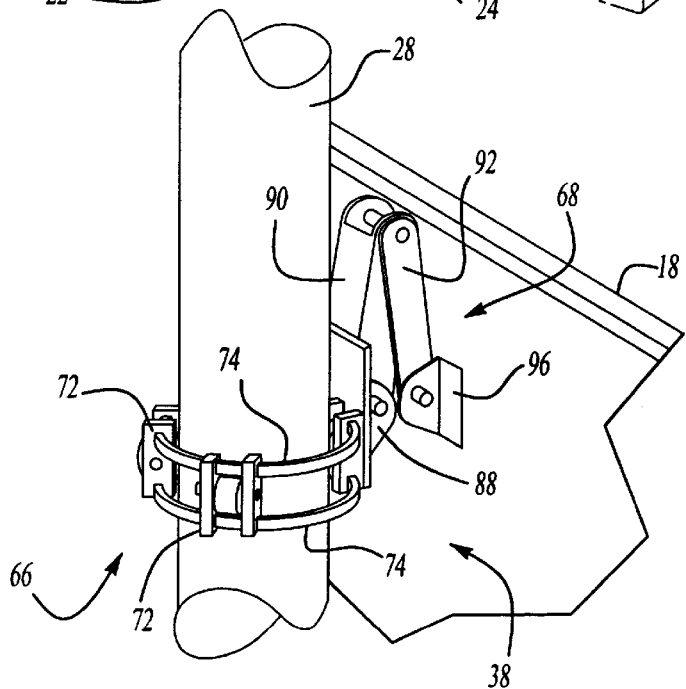
FIG. 3 is a perspective view of the upper connection assembly including the kickout link mechanism and the roller guide mechanism operably disposed by a vertical portion of the sport bar.

With reference to FIG. 1 a rear portion of pickup truck 10 is illustrated which includes cargo box 12 supported on a vehicle frame (not shown). Cargo box 12 is generally rectangular in shape and includes front wall 14 and rear wall 16 operably disposed between and laterally spacing apart by a pair of side walls 18, 18N and cargo bed or floor 20. Wheel well 22, 22N is formed within side wall 18, 18N and cargo bed 20 to provide sufficient clearance for rear wheel assembly 24. Pickup truck 10 further includes sport bar assembly 26 having a pair of vertical front bars 28, 28N interconnected by front cross member 30 and a pair of vertical rear bars 32, 32N interconnected to front bars 28, 28N by longitudinal bars 34, 34N. Wheel well 22, 22N is defined by opening formed in side wall 18 and fender 36, 36N formed in cargo bed 20 to partially enclose rear wheel assembly 24.

As illustrated in the preferred embodiment, at least one of side wall 18 and side wall 18N is operably positionable from a closed position (as shown in solid lines in FIG. 1) to an open position (as shown in phantom lines in FIG. 1), and thus functions as a drop-down side gate assembly. One skilled in the art will readily appreciate that one or both of the side walls may be appropriately equipped to be operably positionable from a closed position to an open position or that the present invention can be adapted for use in conjunction with rear wall 16 to provide a drop-down rear gate assembly. However, further description of the present invention will referenced to a single drop-down gate assembly.

Figure 8:
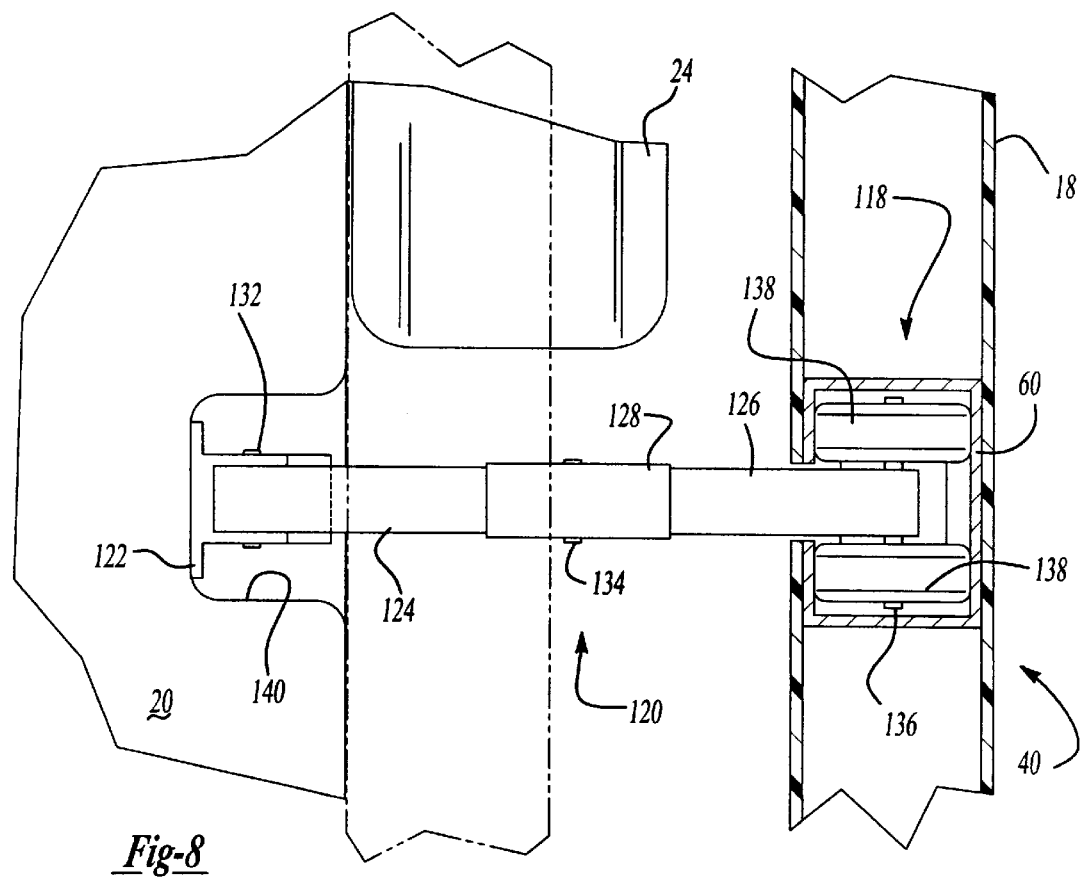
FIG. 8 is a top view illustrating detailed portions of the lower connection assembly.

In order to effectuate the desired movement, side wall 18 is operably coupled to pickup truck 10, and more specifically sport bar assembly 26, through a pair of upper connection assemblies 38, and a lower connection assembly 40. Thus, upper and lower connection assemblies 38, 40 define a three-point support structure which permits movement of side wall 18 relative to cargo box 12 in a direction laterally outwardly and vertically downwardly. However, one skilled in the art will readily recognize that the number and location of connection assemblies may vary based on the specific configuration of the gate assembly. As will be appreciated from further description of the preferred embodiment, movement in a laterally outwardly direction is provided to ensure clearance of side wall 18 over a portion of rear wheel assembly 24 which otherwise extends beyond a vertical plane defined by cargo box 12 as best seen in FIG. 8. Likewise, movement of side wall 18 vertically downwardly provides access to the interior volume of cargo box 12.

Figure 2:
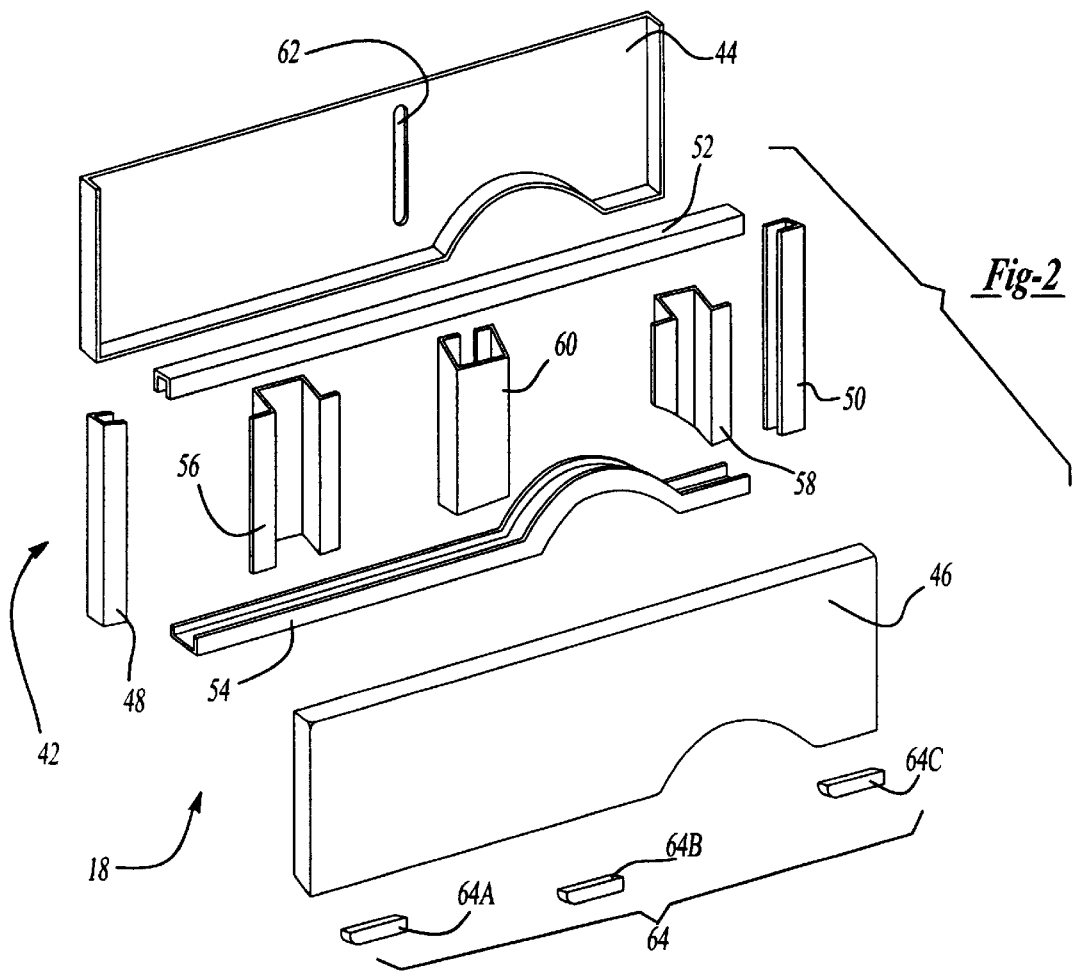
FIG. 2 is an exploded perspective view of the gate panel.

With reference now to FIG. 2, an exploded view of side wall 18 is illustrated. As presently preferred, side wall 18 is fabricated utilizing a sheet and stringer type construction. More specifically, side wall 18 includes frame assembly 42 enclosed by inner panel 44 and outer panel 46. Frame assembly 42 includes front vertical rail 48, rear vertical rail 50, upper horizontal rail 52 and lower horizontal rail 54. Rails 48, 50, 52, 54 are generally U-shaped in cross-section and interconnected to define a generally rectangular configuration corresponding to the shape of side wall 18. Intermediate rails 56, 58 extend between upper and lower horizontal rails 52, 54 to provide further rigidity to side wall 18. As presently preferred, intermediate rails 56, 58 have a generally U-shaped cross-section with a flange portion extending from the free end thereof for purposes of securing intermediate rail 56, 58 to outer panel 46. Similarly, side wall 18 includes track rail 60 operably disposed between upper and lower horizontal rails 52, 54. Track rail 60 is generally C-shaped in cross-section and is adapted to receive a portion of lower connection assembly 40 as hereinafter described. Inner panel 44 has elongated slot 62 formed therein adjacent the opening of track rail 60 for operably coupling side wall 18 to cargo box 12 via lower connection assembly 40. Side wall 18 may further include a bumper assembly 64 secured along a bottom edge of side wall 18. More specifically, bumper assembly 64 includes a plurality of bumpers 64a, 64b, 64c which minimize damage to side wall 18 from contact with the adjacent road surface.

With reference now to FIGS. 3 through 7, upper connection assembly 38 is described in detail. Upper connection assembly 38 includes flexible roller guide mechanism 66 operably disposed about a vertical bar 28, 32 of sport bar assembly 26 and kickout link mechanism 68 operably disposed between flexible roller guide mechanism 66 and inner panel 44 of side wall 18. Upper connection assembly 38 enables side wall 18 to move laterally outwardly relative to cargo box 12 through articulation of kickout link mechanism 68 and vertically downwardly with respect to cargo box 12 as a result of relative movement between flexible roller guide mechanism 66 and a vertical bar 28, 32 of sport bar assembly 26. While the sport bar assembly is used as a fixed vertical support member in the preferred embodiment, one skilled in the art would recognize that other fixed vertical structures could be utilized for interconnecting and operably supporting the upper connection assembly.

Figure 4:
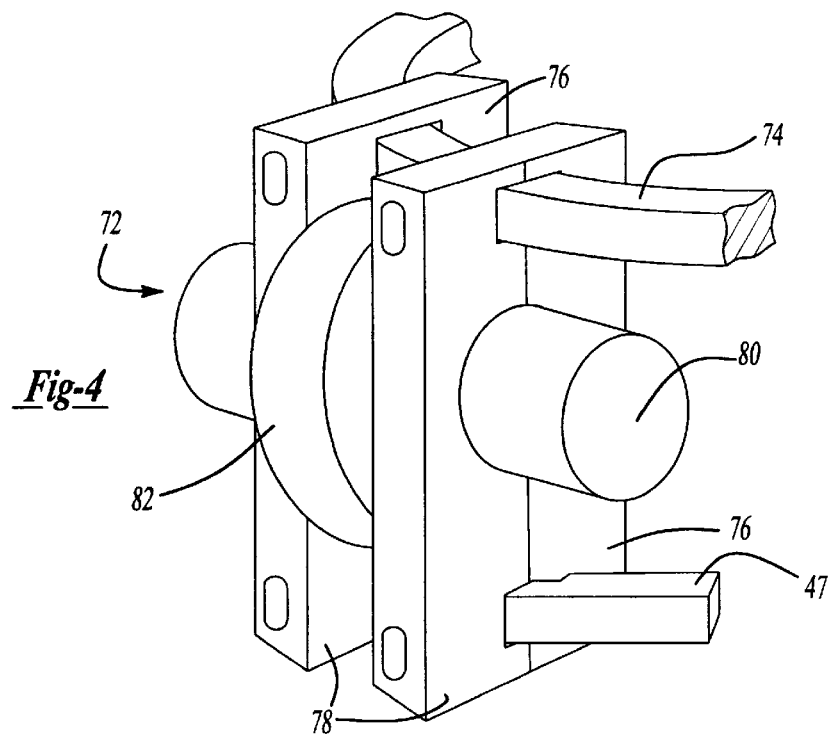
FIG. 4 is a detailed perspective view of the roller guide mechanism.
Figure 5:
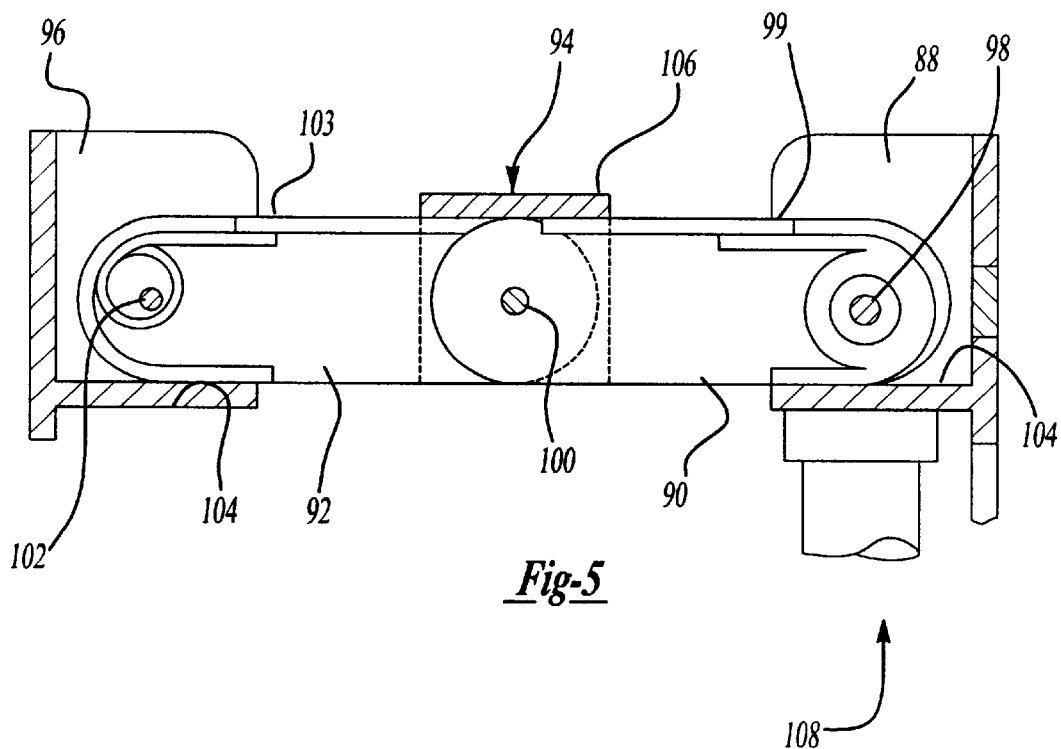
FIG. 5 is a cross-section of the kickout link mechanism.
Figure 6:
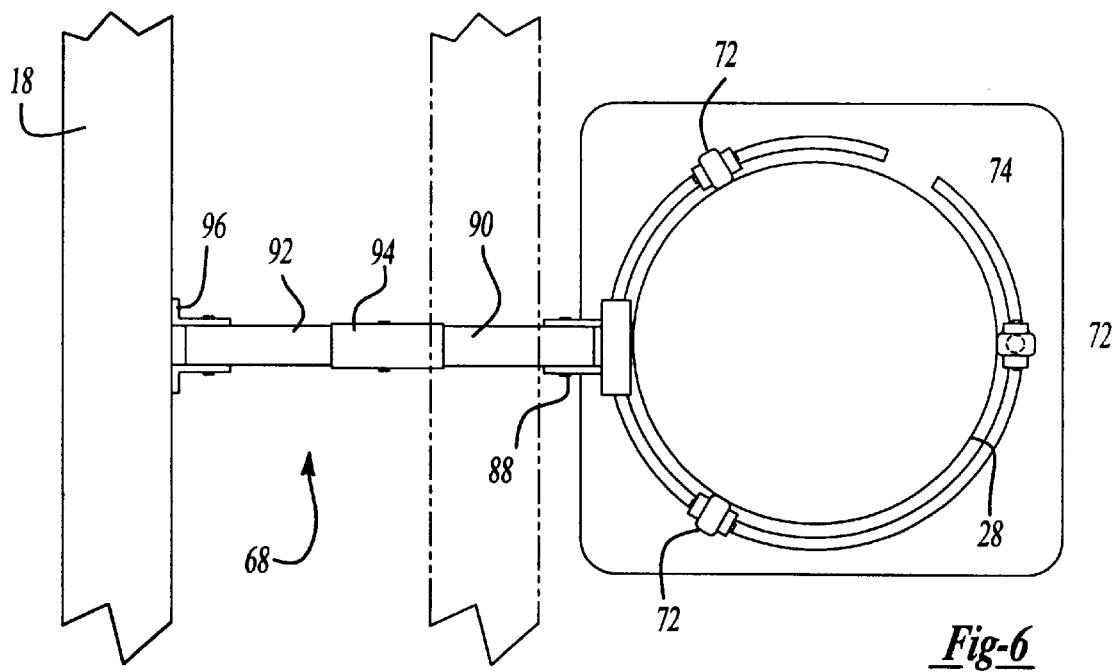
FIG. 6 is a detailed top view illustrating the upper connection assembly.

Flexible roller guide mechanism 66 includes a plurality of roller guides 72 interconnected by a pair of flexible roller brackets 74 so as to be maintained in a spaced relationship about the circumference of vertical bar 28. As presently preferred, flexible roller bracket 74 is an open, generally circular member which possesses adequate compliance to flex so as to accommodate dimensional differences between sport bar assembly 26 and cargo box 12 due to dimensional and manufacturing tolerances. With particular reference to FIG. 4, roller guide 72 includes a pair of inner bearing blocks 76 and a pair of outer bearing blocks 78 adapted to support axle 80 and roller 82 therebetween such that roller 82 rotates freely about axle 80. A slot is formed along the adjacent edges of inner and outer bearing blocks 76, 78 for receiving flexible roller bracket 74. Inner and outer bearing blocks 76, 78 are secured together by any suitable means such as a threaded fastener (not shown). As presently preferred, flexible roller guide mechanism 66 includes two flexible roller brackets 74 interconnecting three roller guides 72 which are equally distributed about the circumference of vertical bar 28. However, one skilled in the art will readily recognize that the number of flexible roller brackets and the number of roller guides may be modified to accommodate the particular application of the present invention, as well as the particular location of the roller guides about the circumference of the vertical bar.

With continued reference to FIGS. 3–6, kickout link mechanism 68 includes inboard bracket 88, inner kickout link 90, outer kickout link 92, capture link 94 and outboard bracket 96. Inboard bracket 88 is operably coupled to flexible roller bracket 74. The inboard end of inner kickout link 90 is pivotally coupled to inboard bracket 88 at pivot 98, while the outboard end of inner kickout link 90 is pivotally coupled to the inboard end of outer kickout link 92 at pivot 100. The outboard end of outer kickout link 92 is pivotally coupled to outboard bracket 96 at pivot 102, while outboard bracket 96 is secured to side wall 18. Capture link 94 is operably disposed about inner and outer kickout links 90, 92 at pivot 100. Torsional spring member 99 is operably disposed about pivot 98 and engages inboard bracket 88 and inner kickout link 90. Similarly, torsional spring member 103 is operably disposed about pivot 103 and engages outboard bracket 96 and outer kickout link 92. Torsional springs 99, 103 bias kickout link mechanism 68 toward the extended position.

Kickout link mechanism 68 is operable in a retracted position wherein inner and outer kickout links 90, 92 are generally vertically disposed so as to place inboard bracket 88 directly adjacent outboard bracket 96. As kickout link mechanism 68 is manipulated into an extended position, pivot 100 rotates downwardly such that inner and outer kickout links 90, 92 extend generally horizontally away from inboard and outboard bracket 88, 96. Inboard and outboard brackets 88, 96 have a horizontal flange 104 formed thereon which functions as a mechanical stop for positioning inner and outer kickout links 90, 92 in a generally horizontal orientation. Furthermore, the web portion 106 of capture link 94 engages an upper edge of inner and outer kickout link 90, 92 such that pivots 98, 100 and 102 are generally horizontally aligned in the extended position.

Figure 7:
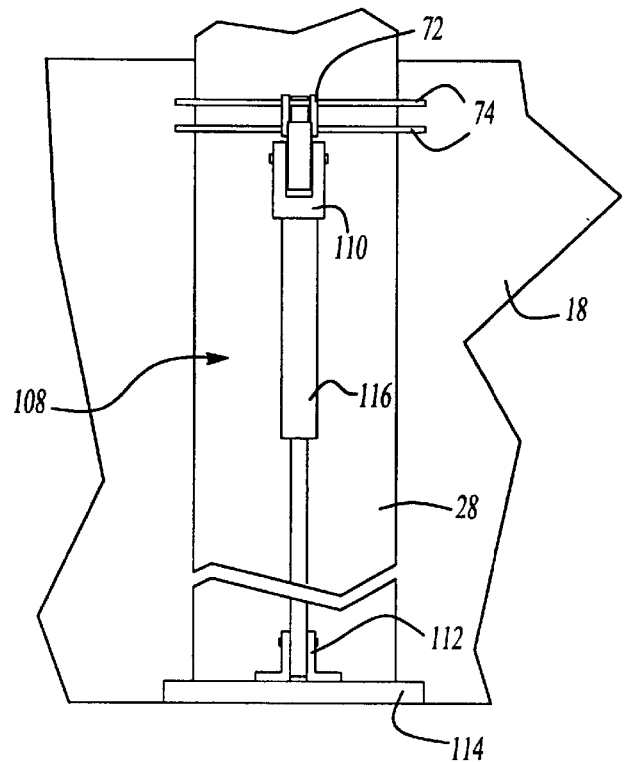
FIG. 7 is a side view of a portion of the upper connection assembly.

With reference now to FIG. 7, a biasing mechanism 108 is operably coupled between upper connection assembly 38 and the bottom portion of vertical bar 28. Biasing mechanism 108 generates a vertically upward force for biasing side wall 18 toward the up position. Biasing mechanism 108 includes upper cleat 110 secured to roller guide 72, lower cleat 112 secured to a horizontal flange 114 of sport bar assembly 26 and gas strut 116 interdisposed between upper-cleat 110 and lowercleat 112.

With particular reference now to FIG. 8, lower connection assembly 40 is illustrated and will be described in greater detail. Lower connection assembly 40 includes a kickout link mechanism 120 which is similar to kickout link mechanism 68 associated with upper connection assembly, however the length of the respective links may be different to provide the proper geometry for achieving the desired movement of side wall 18. Lower connection assembly 40 also includes track roller mechanism 118 operably coupled to the outboard end of kickout link mechanism 120 and operably associated with track rail 60 of side wall 18.

Kickout link mechanism 120 includes inboard bracket 122 secured to a portion of cargo box 12, inner kickout link 124, outer kickout link 126 and capture link 128. The inboard end of inner kickout link 124 is pivotally coupled to inboard bracket 122 at pivot 132. The outboard end of inner kickout link 124 is pivotally coupled to the inboard end of outer kickout link 126 at pivot 134. Capture link 128 is also pivotally coupled to kickout link mechanism 120 at pivot 134 to provide a stop as heretofore described in association with kickout link mechanism 68. The outboard end of outer kickout link 126 is coupled to track roller mechanism 118. Track roller mechanism 118 includes an axle 136 for receiving a pair of wheels 138. Wheels 138 are appropriately sized to roll within track rail 60. As presently preferred, inboard bracket 122 is secured within a pocket 140 formed within cargo bed 20, thereby enabling side wall 18 to be positionable from an open position wherein side wall 18 is spaced laterally away from cargo box 12 to provide clearance past rear wheel assembly 24 (as shown in solid lines in FIG. 8) and a closed position wherein side wall 18 is positioned directly adjacent cargo bed 20 (as shown in phantom lines in FIG. 8).

Based on the foregoing description, one skilled in the art will readily appreciate that upper connection assembly 38 rolls along a path defined by vertical bars 28, 32 of sport bar assembly 26 with dimensional variations due to tolerancing and manufacturing being accommodated by flexible roller brackets 74. Thus, upper connection assembly 38 moves with side wall 18 and relative to the remaining components of cargo box 12. In contrast, lower connection assembly 40 is fixedly secured to cargo box 12 and side wall 18 moves relative thereto during manipulation from the closed position to the open position.

Figure 9:
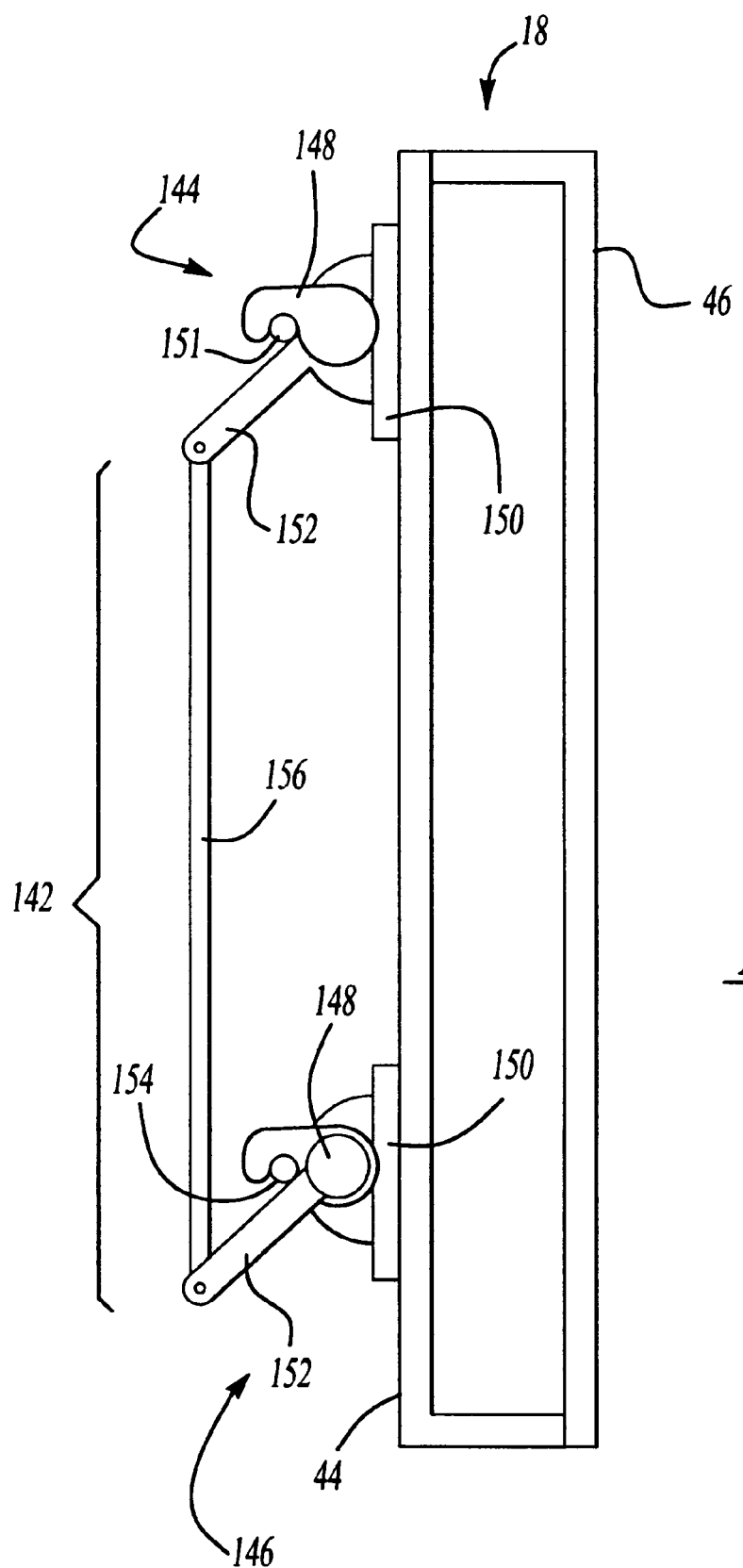
FIG. 9 is a cross-section of the latch mechanism.

With reference now to FIG. 9, catch assembly 142 is illustrated which provides means for locking side wall 18 in the closed position or in the open position. Catch mechanism 142 includes upper clasp mechanism 144 and lower clasp mechanism 146. Lower clasp mechanism 146 is substantially identical to upper clasp mechanism 144, and as such only upper clasp mechanism 144 will be hereinafter described. Clasp mechanism 144 includes hook 148 supported for rotational movement on bearing block 150 which is secured to inner panel 44 of side wall 18. Lever arm 152 extends from hook 148 and is capable of co-rotation therewith. Pin 154 is secured to a fixed portion of cargo box 12 (i.e., other than side wall 18) and is located adjacent hook 148 when side wall 18 is appropriately positioned in the closed or open position. Connection link 156 extends between lever arm 152 of upper clasp mechanism 144 and lever arm 152 of lower clasp mechanism 146 such that manipulation of connection link 156 provides concurrent rotation of hook 148 associated with upper and lower clasp mechanism 144, 146. While catch assembly 142 of the present invention has been described as a pair of co-rotating clasp mechanisms, one skilled in the art will readily appreciate that other latch assemblies are readily adaptable for use in the present invention including various rotating or sliding catch mechanisms commonly associated with vehicle doors, gates, hoods or trunks and other door or window assemblies.

With continued reference to the figures, the operation of the present invention will now be described. In the closed position, side wall 18 is in the fully upward and inward position as illustrated in solid lines in FIG. 1 such that cargo box 12 defines a generally closed rectangular configuration. When it is desirable to lower side wall 18, catch assembly 142 is manipulated from a locked position to an unlocked position by manipulating connection link 156 upwardly (as seen in FIG. 9) such that hook 148 rotates clockwise to disengage pin 154, thereby unlocking side wall 18 from cargo box 12. Once unlocked, side wall 18 is moved outwardly as a result of the spring biasing on kickout link mechanisms 68, 120. More specifically, inner and outer kickout links 90, 92, 124, 126 move from a generally vertical orientation to a generally horizontal orientation such that side wall 18 moves laterally outwardly to clear rear wheel assembly 24. At this point, side wall 18 remains in a vertically up position as a result of biasing mechanism 108. However, a moderate downward force may be applied to side wall 18 to overcome the force generated by biasing mechanism 108, thereby moving side wall 18 downwardly toward an open position as shown in phantom lines in FIG. 1. Once in the downward position, catch assembly 142, and more specifically hook 148 engages a second pin (not shown) to lock side wall 18 in the downward position. In this position, the upper edge of side wall 18 is located approximately adjacent to the upper surface of cargo bed 20 thereby facilitating access to the interior volume of cargo box 12.

While the invention has been described in the specification and illustrated in the drawings with reference to a preferred embodiment, it will be understood by those skilled in the art that various changes may be made and equivalents may be substituted for elements thereof without departing from the spirit and scope of the invention as defined in the claims. In addition, modifications may be made to adapt the present invention to a particular situation or material without departing from the essential scope thereof. Therefore, it is intended that the invention not be limited to the particular embodiment illustrated by the drawings and described in the specification as the best mode presently contemplated for carrying out this invention, but that the invention will include any embodiment falling within the description of the appended claims.

What is claimed:

1. A drop-down gate assembly for providing access to a cargo box of a vehicle, the cargo box including a front wall, a rear wall and a cargo bed, comprising:

a first side wall coupled to the front wall, rear wall and cargo bed;

a second side wall coupled to the cargo bed and being positionable between a closed position and an open position, the front wall, rear wall, cargo bed, first side wall and the second side wall while in the closed position forming the cargo box;

a kickout link mechanism coupled to the second side wall for providing lateral movement of said second side wall relative to said cargo box; and a roller guide mechanism coupled to the second side wall for providing sliding movement of said second side wall relative to said cargo box.

2. The drop-down gate assembly of claim 1 wherein the first side wall is positionable between a closed and an open position and further comprising:

a second kickout link mechanism coupled to the first side wall for providing lateral movement of said second side wall relative to said cargo box; and a second roller guide mechanism coupled to the first side wall for providing sliding movement of said second side wall relative to said cargo box.

3. The drop-down gate assembly of claim 1 wherein said roller guide mechanism comprises an axle extending from an end of said kickout link mechanism and a wheel rotatably supported on said axle, said wheel engageable with a track formed in said gate.

4. The drop-down gate assembly of claim 1 further comprising a biasing mechanism operably coupled between said roller guide mechanism and said cargo box to urge said gate upwardly towards said closed position.

5. A drop-down gate assembly for providing access to a cargo box of a vehicle, comprising:

a gate positionable between a closed position and an open position relative to the cargo box;

a kickout link mechanism for providing lateral movement of said gate relative to said cargo box; and a roller guide mechanism for providing sliding movement of said gate relative to said cargo box, wherein said kickout link mechanism comprises a first bracket secured to said roller guide mechanism, a second bracket secured to said gate and at least one link pivotally connected between said first bracket and said second bracket, said at least one link being positionable between a retracted position and an extended position.

6. The drop-down gate assembly of claim 5 wherein said kickout link mechanism further comprises a spring member operably coupled to said at least one kickout link for biasing said kickout link mechanism towards said extended position.

7. The drop-down gate assembly of claim 5 wherein said kickout link mechanism further comprises a first kickout link pivotally connected to said first bracket at a first pivot and a second kickout link pivotally connected to said first kickout link at a second pivot and pivotally connected to said second bracket at a third pivot.

8. The drop-down gate assembly of claim 7 wherein said kickout link mechanism further comprises a capture link pivotally connected to said first and second kickout links at said second pivot, said capture link providing a mechanical stop for defining said extended position.

9. A drop-down gate assembly for providing access to a cargo box of a vehicle, comprising:

a gate positionable between a closed position and an open position relative to the cargo box;

a kickout link mechanism for providing lateral movement of said gate relative to said cargo box; and a roller guide mechanism for providing sliding movement of said gate relative to said cargo box, wherein said kickout link mechanism comprises a first bracket secured to said gate and at least one kickout link pivotally connected to said first bracket at a first pivot and operably coupled to said roller guide mechanism.

10. The drop-down gate assembly of claim 9 wherein said kickout link mechanism further comprises a spring member operably coupled to said at least one kickout link for biasing said kickout link mechanism towards said extended position.

11. The drop-down gate assembly of claim 9 wherein said kickout link mechanism further comprises a first kickout link pivotally connected to said first bracket at a first pivot and a second kickout link pivotally connected to said first kickout link at a second pivot and operably coupled to said roller guide mechanism.

12. The drop-down gate assembly of claim 11 wherein said kickout link mechanism further comprises a capture link pivotally connected to said first and second kickout links at said second pivot, said capture link defining a mechanical stop for defining said extending position.

13. A drop-down gate assembly for providing access to a cargo box of a vehicle, comprising:

a gate positionable between a closed position and an open position relative to the cargo box;

a kickout link mechanism for providing lateral movement of said gate relative to said cargo box; and a roller guide mechanism for providing sliding movement of said gate relative to said cargo box, wherein said roller guide mechanism comprises a roller bracket secured to said kickout mechanism and at least one roller guide, said at least one roller guide having a roller block secured to said roller bracket and a roller rotatable supported in said roller block and engageable with a portion of said cargo box to provide relative sliding movement between said cargo box and said connection assembly.

14. The drop-down gate assembly of claim 13 wherein said roller bracket further comprises a flexible bracket having sufficient compliance to accommodate a dimensional difference between said gate and said cargo box.

15. The drop-down gate assembly of claim 13 wherein said roller guide mechanism further comprises a plurality of roller guides secured to said roller bracket in a spaced relationship, each of said roller guides having a roller block secured to said roller bracket and a roller rotatable supported in said roller block and engageable with a portion of said cargo box to provide relative sliding movement between said cargo box and said connection assembly.

16. A cargo box for a vehicle comprising:

a cargo box having a first wall, a second wall, a third wall, a cargo bed and a fixed vertical support structure;

a gate laterally and vertically positionable between a closed position and an open position relative to a cargo box;

a first connection assembly operably coupling said gate to said cargo box and including a first roller guide mechanism supported for sliding movement on said vertical support structure to provide vertical movement of said gate relative to said cargo box, and a first kickout link mechanism secured to said gate and positionable between a retracted position and an extended position to provide lateral movement of said gate relative to said cargo box; and a second connection assembly operably coupling said gate to cargo box and including a second roller guide mechanism supported for sliding movement on said gate to provide vertical movement of said gate relative to said cargo box and a second kickout link mechanism secured to said cargo box and positionable between a retracted position and an extended position to provide lateral movement of said gate relative to said cargo box.

17. The drop-down gate assembly of claim 16 wherein said first kickout link mechanism comprises a first bracket secured to said first roller guide mechanism, a second bracket secured to said gate, a first kickout link pivotally connected to said first bracket at a first pivot and a second kickout link pivotally connected to said first kickout link at a second pivot and pivotally connected to said second bracket at a third pivot.

18. The drop-down gate assembly of claim 16 wherein said first roller guide mechanism comprises a roller bracket secured to said kickout link mechanism and a plurality of roller guides secured to said roller bracket in a spaced relationship about said vertical support structure, each of said roller guides having a roller block secured to said roller bracket and a roller rotatable supported in said roller block and engageable with said vertical support structure.

19. The drop-down gate assembly of claim 16 wherein said second kickout link mechanism comprises a first bracket secured to said gate, a first kickout link pivotally connected to said first bracket at a first pivot and a second kickout link pivotally connected to said first kickout link at a second pivot and operably coupled to said second roller guide mechanism.

20. The drop-down gate assembly of claim 16 wherein said second roller guide mechanism comprises an axle extending from said kickout link mechanism and a wheel rotatably supported on said axle, said wheel engageable with a track formed in said gate.

21. The drop-down gate assembly of claim 16 wherein each of said first and second kickout link mechanisms further comprises a spring member operably associated therewith to bias said first and second kickout link mechanisms towards said extended position.

22. The drop-down gate assembly of claim 16 further comprising a biasing mechanism operably coupled between said first connection assembly and said cargo box to urge said gate upwardly towards said closed position.

23. The drop-down gate assembly of claim 16 further comprising a latch mechanism interconnected between said gate and said cargo box, said latch mechanism operable in a locked mode to secured said gate to said cargo box and an unlocked mode to release said gate from said cargo box.

24. A cargo box for a vehicle comprising:
   a cargo box including a first wall, a second wall, a third wall, a cargo bed and a sport bar assembly having a first vertical bar and a second vertical bar;
   a gate positionable between a closed position and an open position relative to a cargo box, said gate having a track formed therein;
   a first connection assembly operably coupling said gate to said cargo box and including:
      a first roller guide mechanism supported for rolling movement on said first vertical bar, said first roller guide mechanism including a roller bracket and a plurality of roller guides secured to said roller bracket in a spaced relationship about said first vertical bar, each of said roller guides having a roller block secured to said roller bracket and a roller rotatable supported in said roller block and engageable with said first vertical bar; and
      a first kickout link mechanism positionable between a retracted position and an extended position, said first kickout link mechanism including an inboard bracket secured to said roller bracket of said first roller, an outboard bracket secured to said gate, an inner kickout link pivotally connected to said inboard bracket at a first pivot, an outer kickout link pivotally connected to said inner kickout link at a second pivot and pivotally connected to said outboard bracket at a third pivot, and a capture link pivotally connected to said inner and outer kickout links at said second pivot to provide a mechanical stop for defining said extended position;
   a second connection assembly operably coupling said gate to said cargo box and including:
      a second roller guide mechanism supported for rolling movement on said second vertical bar, said second roller guide mechanism including a roller bracket and a plurality of roller guides secured to said roller bracket in a spaced relationship about said second vertical bar, each of said roller guides having a roller block secured to said roller bracket and a roller rotatable supported in said roller block and engageable with said second vertical bar; and
      a second kickout link mechanism positionable between a retracted position and an extended position, said second kickout link mechanism including an inboard bracket secured to said roller bracket of said second roller guide mechanism, an outboard bracket secured to said gate, an inner kickout link pivotally connected to said inboard bracket at a first pivot, a outer kickout link pivotally connected to said inner kickout link at a second pivot and pivotally connected to said outboard bracket at a third pivot, and a capture link pivotally connected to said inner and outer kickout links at said second pivot to provide a mechanical stop for defining said extending position;
   a third connection assembly operably coupling said gate to said cargo box and including:
      a third kickout link mechanism positionable between a retracted position and an extended position, said third kickout link mechanism including an inboard bracket secured to said cargo box, an inner kickout link pivotally connected to said inboard bracket at a first pivot, an outer kickout link pivotally connected to said inner kickout link at a second pivot, and a capture link pivotally connected to said inner and outer kickout links at said second pivot to provide a mechanical stop for defining said extending position; and
      a third roller guide mechanism supported for rolling movement on said gate, said third roller guide mechanism including an axle extending from an end of said outer kickout link and a wheel rotatably supported on said axle and engagable with said track formed in said gate.

* * * * *